March 18, 1924.
C. W. YERGER
MOTOR CONTROLLER
Filed June 23, 1919
1,487,422
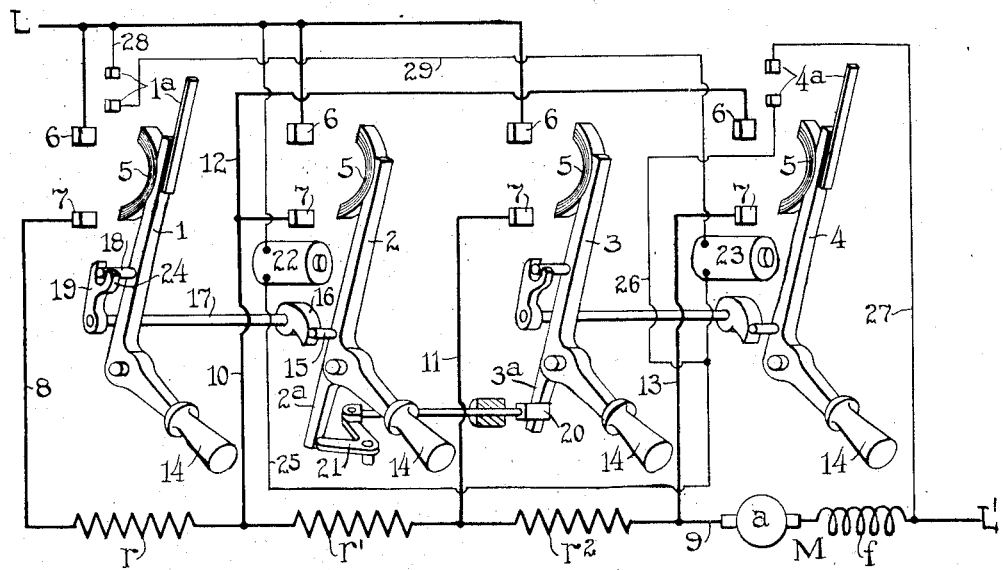
INVENTOR.
Charles W. Yerger
BY
ATTORNEY Patented Mar. 18, 1924.

1,487,422

UNITED STATES PATENT OFFICE.

CHARLES W. YERGER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed June 23, 1919. Serial No. 305,965.

*To all whom it may concern:*

Be it known that I, CHARLES W. YERGER, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to improvements in motor controllers.

In my prior application Serial No. 279,670, filed February 28, 1919, there is disclosed a method of utilizing a number of switches to effect a relatively greater number of steps of control and the present invention has among its objects to provide a controller of the so-called multiple switch type for controlling an electric motor in accordance with such method.

Another object is to provide a controller of the aforesaid type with means insuring against operation of the several switches except in the desired sequence.

Another object is to provide a controller of the aforesaid character affording low voltage protection.

Various other objects and advantages of the invention will hereinafter appear.

The accompanying drawing schematically and diagrammatically illustrates one embodiment of the invention which will now be described, it being understood that the invention may be embodied in other forms falling within the scope of the appended claims.

Referring to the drawing, the same illustrates a controller comprising four separately operable switches 1 to 4 to control an electric motor M through the medium of three resistance sections $r$, $r'$ and $r^2$ in such a manner as to afford six steps of control. The motor M is shown as provided with an armature $a$ and series field $f$ but it is to be understood that the motor might be of other types.

Each of the switches 1 to 4 is provided with a laminated brush 5 to bridge a pair of stationary contacts 6 and 7 and the power connections are such that upon closure of switch 1 circuit is completed from line L through said switch, by conductor 8 through resistances $r$, $r'$ and $r^2$ in series by conductor 9 through the motor armature and series field to line L'. Upon closure of switch 2 circuit is completed from line L through said switch by conductor 10 to a point between resistances $r$ and $r'$, thus short circuiting the former resistance, while upon closure of switch 3 circuit is completed from line L through said switch, by conductor 11 to a point between resistances $r'$ and $r^2$ thus also short circuiting resistance $r'$. Thus closure of switches 1, 2 and 3 successively provides for three steps of control and opening of switches 1 and 2, accompanied by closure of switch 4, completes circuit from conductor 11 through resistance $r^2$ by conductors 10 and 12 through said switch 4 by conductor 13 to conductor 9, thus paralleling resistances $r'$ and $r^2$ for a further step of control. Further, the connections are such that reclosure of switch 1 completes circuit from line L by conductor 8 through resistance $r$, by conductors 10 and 12 through switch 4 to conductor 9, thus paralleling resistance $r$ with resistances $r'$ and $r^2$ for a further step of control, while reclosure of switch 2 completes circuit from line L through said switch by conductor 12 through switch 4 and by conductors 13 and 9 directly to the motor, thus throwing the motor directly on the line as a final step of control.

For simplicity of illustration each of the switches is shown as comprising a pivoted arm having a rigidly connected operating handle 14, although in practice it is preferred to employ switches of the type shown in the patent to T. E. Barnum 959,910, of May 31, 1910. Also, for simplicity of illustration, the switches are shown as interlocked by the means now to be described, although in practice it is preferred to follow more closely the design of the interlocking means shown in said Barnum patent. As shown, the switch 2 is provided with a laterally extending pin 15 and a co-operating cam 16 carried by a rock shaft 17, said cam being normally disposed in the path of said pin to prevent closure of said switch while the switch 1 is provided with a laterally extending pin 18 adapted to co-operate with a lug 19 on said rock shaft to withdraw the cam 16 from the path of pin 15 when switch 1 is moved to closed position. This insures against closure of switch 2 until after closure of switch 1 and switches 3 and 4 are similarly interlocked whereby closure of switch 4 is prevented until after closure of switch 3. Also, switch 3 is normally locked in open position by a sliding bar 20 extending across the path of a lug 3ª on said switch, said bar being connected to a bell crank lever 21 operable by an extension 2ª of switch 2 to release switch 3 upon closure of switch 2. Thus closure of switch 4 is rendered dependent upon prior closure of switch 3 while closure of switch 3 is rendered dependent upon prior closure of switch 2, closure of switch 2 being in turn rendered dependent upon prior closure of switch 1 which insures against closure of said switches except in the order of their reference numerals. When switches 1 and 2 are opened as above set forth following closure of switch 3, reclosure of switch 2 is again rendered dependent upon prior closure of switch 1 whereby the above described desired sequence of operation of the switches is positively insured. In this connection it is to be noted that the interlock between switches 2 and 3 in no wise interferes with the opening of switches 1 and 2 following closure of switch 3.

While in practice the switches might if desired be arranged to remain closed, until forcibly opened, each is preferably biased to return to open position and provided with means to lock the same in closed position subject to release upon failure of voltage. To this end switches 2 and 4 are respectively provided with retaining magnets 22 and 23, while switches 1 and 3 are provided with mechanical locking means under the control of switches 2 and 4 respectively. More specifically, the interlocking lugs 19, associated with switches 1 and 3, are each provided with a hook 24 to engage the pin 18 of its respective switch, said hooks being thrown into engagement with said pins by pressure of the pins 15 of switches 2 and 4 against the cams 16 upon closure of the latter switches. Thus in operation switch 1 is mechanically locked in closed position upon closure of switch 2, the latter switch being held closed by magnet 22 while switch 3 is mechanically locked in closed position upon closure of switch 4, the latter switch being held closed by magnet 23. However the circuit arrangement is such that energization of magnet 22 is rendered dependent upon closure of switch 4, which has auxiliary contacts 4ª in circuit with said magnet while energization of magnet 23 is rendered dependent upon closure of switch 1 which has auxiliary contacts 1ª in circuit with said magnet. Accordingly, assuming hand over hand operation of the switches in the order above described, the switch 2 is left free to open when the operator releases the same to grasp the switch 4 and said switch 2 in opening releases switch 1 whereas upon closure of switch 4 and subsequent reclosure of switches 1 and 2, the latter switch is held closed by magnet 22. Moreover, switch 4 must be manually held closed until switch 1 is reclosed to energize magnet 23 and switch 2 must then be closed to hold switch 1 in closed position. This provides for release of all switches in the event that the full sequence of operations is not completed and thereby insures against leaving any portion of the resistance in circuit.

The circuit of magnet 22 extends from line L through said magnet, by conductors 25 and 26 through the auxiliary contacts 4ª of switch 4, by conductor 27 to line L', while the circuit of magnet 23 extends from line L by conductor 28 through the auxiliary contacts of switch 1, by conductor 29 through said magnet to conductor 26 and thence to line L' as described. Both magnets are thus connected across the line whereby they are subject to de-energization upon failure of voltage to thereby release all of the switches.

While the controller illustrated is provided with only four switches it is to be understood that the same may be provided with additional switches where control of additional resistance sections is desired. Also, it is to be understood that the low voltage magnets may be subjected to push button or overload control in the known ways and it is to be noted that the controller is particularly adapted to such overload control since the motor circuit is finally broken thereby at three points.

What I claim as new and desire to secure to secure by Letters Patent is:

1. In a motor controller, in combination, a plurality of manually operable switches to be operated in a definite sequence including closure and reclosure of certain thereof, and interlocking means providing against operation of said switches except in such definite sequence.

2. In a motor controller, in combination, a plurality of manually operable switches to be operated in a definite sequence including opening of certain of said switches following closure of other of said switches and subsequent reclosure of said certain of said switches, and interlocking means for said switches for preventing operation thereof except in said definite sequence.

3. In a motor controller, in combination, a plurality of manually operable switches biased to open position, said switches having means requiring the same to be closed in a definite order and permitting certain of said switches to be opened and reclosed after closure of other of the same and means for restraining certain of said switches in closed position but only after completion of the aforesaid operations thereof.

4. In a motor controller, in combination, a plurality of manually operable switches biased to open position, said switches having means requiring the same to be closed in a definite order and permitting certain of said switches to be opened and reclosed after closure of other of the same and means for restraining certain of said switches in closed position but only after completion of the aforesaid operations thereof and subject to release thereof under given electrical conditions.

5. In a motor controller, in combination, a plurality of manually operable switches biased to open position, said switches to be closed in a definite order, means for restraining certain of said switches in closed position and means for restraining the remainder of said switches in closed position, said first mentioned means having means rendering the same ineffective to so function until after closure of one of said last mentioned switches whereby certain of the previously closed switches may be opened and reclosed after closure of other of the same.

6. In a motor controller, in combination, a plurality of manually operable switches biased to open position, said switches to be closed in a definite order, means including a magnet for retaining certain of said switches in closed position and means including a low voltage magnet for holding the remainder of said switches in closed position, and rendering energization of said first mentioned magnet dependent upon prior closure of one of said last mentioned switches, to thereby permit opening and reclosure of certain of said switches after closure of other of the same.

7. In a motor controller, in combination, a plurality of manually operable switches biased to open position and means necessitating closure of said switches in a definite order and retaining the same in closed position but permitting certain of said switches to be opened and reclosed after closure of other of the same.

8. In a motor controller, in combination, a plurality of manually operable switches biased to open position, mechanical interlocking means for said switches necessitating closure thereof in a definite sequence and providing for retention of certain of said switches in closed position by other of said switches and separate retaining magnets for the last mentioned switches, one of said retaining magnets being dependent for energization upon closure of the switch held closed by the other magnet, to permit certain of said switches to be opened and reclosed after closure of another of said switches.

9. In a motor controller, in combination, a plurality of switches biased to open position, means necessitating closure of said switches in a definite order, said means including means for holding certain of said switches closed when other of said switches are closed, and electro-responsive means for holding certain of said switches closed when other of said switches are closed.

10. In a motor controller, in combination, a plurality of pairs of switches biased to open position, said switches to be closed in a definite order, means associated with one switch of each pair for holding the other switch in closed position, and electro-responsive means controlled by one pair of switches for holding another pair of switches in closed position.

11. In a motor controller, in combination, a plurality of groups of switches, means necessitating closure of said switches in a definite order and opening of the switches of each group in a definite order while permitting opening of the switches of one group when the switches of another group are closed, and separate electromagnets for holding a plurality of said switches in closed position.

12. In a motor controller, in combination, a plurality of groups of manually operable switches biased to open position, means necessitating closure of said switches in a definite order, means necessitating opening of the switches in each group in a definite order with respect to each other, means permitting opening of all switches in each group irrespective of the position of the switches in another group, and means for restraining all of said switches in closed position when all of said switches have been closed.

13. In a motor controller, in combination, a plurality of groups of manually operable switches biased to open position, means necessitating closure of said switches in a definite order, means associated with one switch of each group for restraining the other switches of that group in closed position, electro-responsive means associated with a switch of one group for holding another group of switches in closed position, and electro-responsive means associated with said last mentioned group of switches for holding said first mentioned group of switches in closed position.

14. In a motor controller, in combination, a plurality of groups of manually operable switches biased to open position, means necessitating closure of said switches in a definite order, and electro-responsive means controlled by one switch in each group for restraining another group of switches in closed position.

In witness whereof, I have hereunto subscribed my name.

CHARLES W. YERGER.